US012023918B2

(12) United States Patent
Jung et al.

(10) Patent No.: US 12,023,918 B2
(45) Date of Patent: Jul. 2, 2024

(54) DYE-SUBLIMATION PRINTER AND REWINDING CORRECTION METHOD

(71) Applicant: DS GLOBAL, Seoul (KR)

(72) Inventors: Gu Berm Jung, Seoul (KR); Sun Kyun Lee, Seoul (KR); Dong Su Nam, Seoul (KR)

(73) Assignee: DS GLOBAL, Seoul (KR)

( * ) Notice: Subject to any disclaimer, the term of this patent is extended or adjusted under 35 U.S.C. 154(b) by 112 days.

(21) Appl. No.: 17/786,994

(22) PCT Filed: Nov. 26, 2020

(86) PCT No.: PCT/KR2020/016972
§ 371 (c)(1),
(2) Date: Jun. 17, 2022

(87) PCT Pub. No.: WO2021/125609
PCT Pub. Date: Jun. 24, 2021

(65) Prior Publication Data

US 2023/0037269 A1 Feb. 2, 2023

(30) Foreign Application Priority Data

Dec. 20, 2019 (KR) ........................ 10-2019-0171545
Dec. 20, 2019 (KR) ........................ 10-2019-0171547
Dec. 20, 2019 (KR) ........................ 10-2019-0171548
Dec. 20, 2019 (KR) ........................ 10-2019-0171549
Dec. 20, 2019 (KR) ........................ 10-2019-0171550
Dec. 20, 2019 (KR) ........................ 10-2019-0171551
Dec. 20, 2019 (KR) ........................ 10-2019-0171552

(51) Int. Cl.
*B41J 15/16* (2006.01)
*B41J 2/325* (2006.01)
(Continued)

(52) U.S. Cl.
CPC .............. *B41J 15/16* (2013.01); *B41J 2/325* (2013.01); *B41J 2/525* (2013.01); *B41J 11/04* (2013.01);
(Continued)

(58) Field of Classification Search
CPC ... B41J 15/16; B41J 2/325; B41J 2/525; B41J 15/04; B41J 11/04; B41J 13/0018; B41J 23/12; B41J 33/00; B41J 33/22; B41J 33/36; B41J 33/44; B41J 33/52; B41M 5/035; B65H 2403/422; B65H 2801/12; B65H 3/0669; B65H 5/06
See application file for complete search history.

(56) References Cited

U.S. PATENT DOCUMENTS

2017/0173979 A1 6/2017 Hoshi et al.

FOREIGN PATENT DOCUMENTS

EP 3118687 B1 8/2018
JP 09-39331 A 2/1997
(Continued)

*Primary Examiner* — Henok D Legesse
(74) *Attorney, Agent, or Firm* — NKL Law; Jae Youn Kim

(57) ABSTRACT

Proposed is a dye-sublimation printer, and more particularly to a dye-sublimation printer that can systematically control upward and downward movements of a pick-up roller, upward and downward movements of a platen roller, and driving of a take-up reel gear according to forward and backward movements of a slide plate.

10 Claims, 10 Drawing Sheets

(51) Int. Cl.

| | |
|---|---|
| ***B41J 2/525*** | (2006.01) |
| ***B41J 11/04*** | (2006.01) |
| ***B41J 13/00*** | (2006.01) |
| ***B41J 15/04*** | (2006.01) |
| ***B41J 23/12*** | (2006.01) |
| ***B41J 33/00*** | (2006.01) |
| ***B41J 33/22*** | (2006.01) |
| ***B41J 33/36*** | (2006.01) |
| ***B41J 33/44*** | (2006.01) |
| ***B41J 33/52*** | (2006.01) |
| ***B41M 5/035*** | (2006.01) |
| ***B65H 3/06*** | (2006.01) |
| ***B65H 5/06*** | (2006.01) |

(52) U.S. Cl.

CPC ........... *B41J 13/0018* (2013.01); *B41J 15/04* (2013.01); *B41J 23/12* (2013.01); *B41J 33/00* (2013.01); *B41J 33/22* (2013.01); *B41J 33/36* (2013.01); *B41J 33/44* (2013.01); *B41J 33/52* (2013.01); *B41M 5/035* (2013.01); *B65H 3/0669* (2013.01); *B65H 5/06* (2013.01); *B65H 2403/422* (2013.01); *B65H 2801/12* (2013.01)

(56) References Cited

FOREIGN PATENT DOCUMENTS

| | | | | |
|---|---|---|---|---|
| JP | 11-179988 | A | 7/1999 | |
| JP | 11-235853 | A | 8/1999 | |
| JP | 3543569 | B2 | 7/2004 | |
| KR | 10-1993-0000279 | A | 1/1993 | |
| KR | 10-0479842 | B1 | 8/2005 | |
| KR | 10-0767106 | B1 | 10/2007 | |
| KR | 10-1486327 | B1 | 2/2015 | |
| KR | 10-1507064 | B1 | 4/2015 | |
| KR | 10-1942659 | B1 | 1/2019 | |
| KR | 10-2019-0030309 | A | 3/2019 | |
| KR | 10-2017066 | B1 | 9/2019 | |
| KR | 102017066 | * | 9/2019 | ............. B41J 11/04 |

* cited by examiner

DYE-SUBLIMATION PRINTER AND REWINDING CORRECTION METHOD

TECHNICAL FIELD

The present invention relates to a dye-sublimation printer, and more particularly to a dye-sublimation printer and a rewinding correction method that can systematically control upward and downward movements of a pick-up roller, upward and downward movements of a platen roller, and driving of a take-up reel gear according to forward and backward movements of a slide plate.

BACKGROUND ART

A dye-sublimation printer is a device which causes a recording medium to be printed with a photo of high quality in such a manner as to apply heat to ribbons coated with dyes in three colors, such as yellow Y, magenta M, and cyan C colors.

Accordingly, the ribbon and the recording medium are transferred in a state of coming into close contact with each other in a space between a head and a platen roller so that the dyes in three colors are sublimated, and transfer of the ribbon, and normal and reverse transfers of the recording medium should be controlled according to each step.

However, in a conventional dye-sublimation printer, the constitutions of a driving device of controlling the transfer of the ribbon and the normal and reverse transfers of the recording medium are very complex, and there was difficulty in controlling them simultaneously.

DETAILED DESCRIPTION OF THE INVENTION

Technical Problem

The present invention has been devised for solving the aforesaid problems, and an object of the present invention is to provide a dye-sublimation printer which can systematically control driving of a take-up reel gear according to forward and backward movements of a slide plate.

Another object of the present invention is to provide a method of correcting a difference in length between a recording medium and an ink ribbon.

Solution for Solving the Problem

In order to solve the technical problems as above, a dye-sublimation printer according to the present invention may comprise: a feed roller, with one side of which is combined a feed gear; a swing lever combined with an axis of the feed roller so as to swing in both directions, and having a swing control groove formed horizontally; a take-up reel gear combined with a winding reel on which a ribbon is wound; and a swing gear combined with the swing lever so as to always engage with the feed gear, and configured to engage or not to engage with the take-up reel gear selectively according to swing directions of the swing lever.

Furthermore, it may be preferable to further comprise a swing control part configured to control a swing of the swing lever, and having an escape groove in which a lower end of the swing lever disappears.

Furthermore, it may be preferable to further comprise: a cam part which is combined with one side of a fixed axis so as to rotate in both directions, and from one side of which protrudes a hook projection; a pick-up plate furnished in a standing state, having a guide groove in which the hook projection is located, and which is formed on an outside wall in a longitudinal direction, and a guide rail which is formed on an inside wall; a pick-up lever, a center of which is fixed to the fixed axis, and on one side of which is formed a pick-up projection located at the guide rail; and a pick-up roller, one end of an axis of which is connected to another side of the pick-up lever, thereby moving upward and downward according to a position of the pick-up projection.

Furthermore, it may be preferable that the guide rail comprises: a lower rail which causes the pick-up projection to be located at a lower portion; an upper rail which causes the pick-up projection to be located at an upper portion; and a slope rail having an inclined surface so as to connect the lower rail and the upper rail.

Furthermore, it may be preferable that the cam part makes the pick-up plate move forward and backward according to a rotation of the cam part because the hook projection whose tip end is located in the guide groove protrudes from one side.

Furthermore, it may be preferable to further comprise: a head having a heating element so as to form an image on a recording medium; a platen plate configured to rotate while maintaining an axial distance centering around the axis of the feed roller; a platen roller supported to an upper portion of the platen plate; a slide plate to which the pick-up plate is connected, thereby moving forward and backward toward a supply side and a discharge side, and from one side of a front end of which is formed to be extended the swing control part; and a lifter furnished at another side of the front end of the slide plate, and configured to cause the platen roller to move upward by entering a lower portion of the platen plate.

Furthermore, it may be preferable to further comprise an engagement maintenance member configured to connect one end of an axis of the platen roller and one end of the axis of the feed roller to each other, having a leg formed to protrude to the discharge side; and a link member configured to connect another end of the axis of the platen roller and another end of the axis of the feed roller to each other.

A rewinding correction method used in the dye-sublimation printer according to the present invention, which forms an image using a ribbon in any one color of cyan, magenta, and yellow colors, then causing each starting point of a recording medium and the ribbon to be relocated, comprising: step 1) in which a platen roller moves downward so as to be spaced apart from a head; step 2) in which a feed roller reversely rotates so that the recording medium moves backward through a space at intervals between the platen roller and the head, thereby being transferred to a starting point of printing; step 3) in which the feed roller normally rotates so that the ribbon is wound while the recording medium moves forward toward a discharge side; and step 4) in which the feed roller reversely rotates so that the recording medium moves backward toward the discharge side, thereby being retransferred to the starting point of printing.

Furthermore, it may be preferable to further comprise a pick-up step in which a pick-up plate moves backward so that one side of a pick-up lever is located at an upper rail formed on one side wall of the pick-up plate, and thus a pick-up roller connected to another side of the pick-up lever moves downward so that the pick-up roller normally rotates in a state of coming in close contact with an upper portion of the recording medium, thereby causing the recording medium to be transferred forward.

Furthermore, it may be preferable that said step 3) is performed in such a manner that a swing lever swings toward the discharge side due to impellent force occurring when the feed roller normally rotates so that a swing gear and a take-up reel gear engage with each other, and thus the ribbon is wound while the recording medium moves forward.

Furthermore, it may be preferable that the pick-up step is performed in such a manner that because the swing lever does not swing toward the discharge side in spite of impellent force occurring when the feed roller normally rotates, the swing gear and the take-up reel gear don't engage with each other, and thus the ribbon is not wound, and only the recording medium moves forward toward the discharge side.

Effect of the Invention

In accordance with the present invention, upward and downward movements of the pick-up roller, upward and downward movements of the platen roller, and driving of the take-up reel gear can systematically be controlled according to forward and backward movements of the slide plate.

Accordingly, the number of parts decreases innovatively, the structure becomes very simple, and the upward and downward movements of the pick-up roller, the upward and downward movements of the platen roller, and the driving of the take-up reel gear can be controlled according to each step.

Furthermore, it is effective to cause the recording medium and the ribbon to be consistent with each other at the starting point of printing because a difference in length between the recording medium and the ink ribbon is corrected.

BEST MODE FOR CARRYING OUT THE INVENTION

Figure 1:
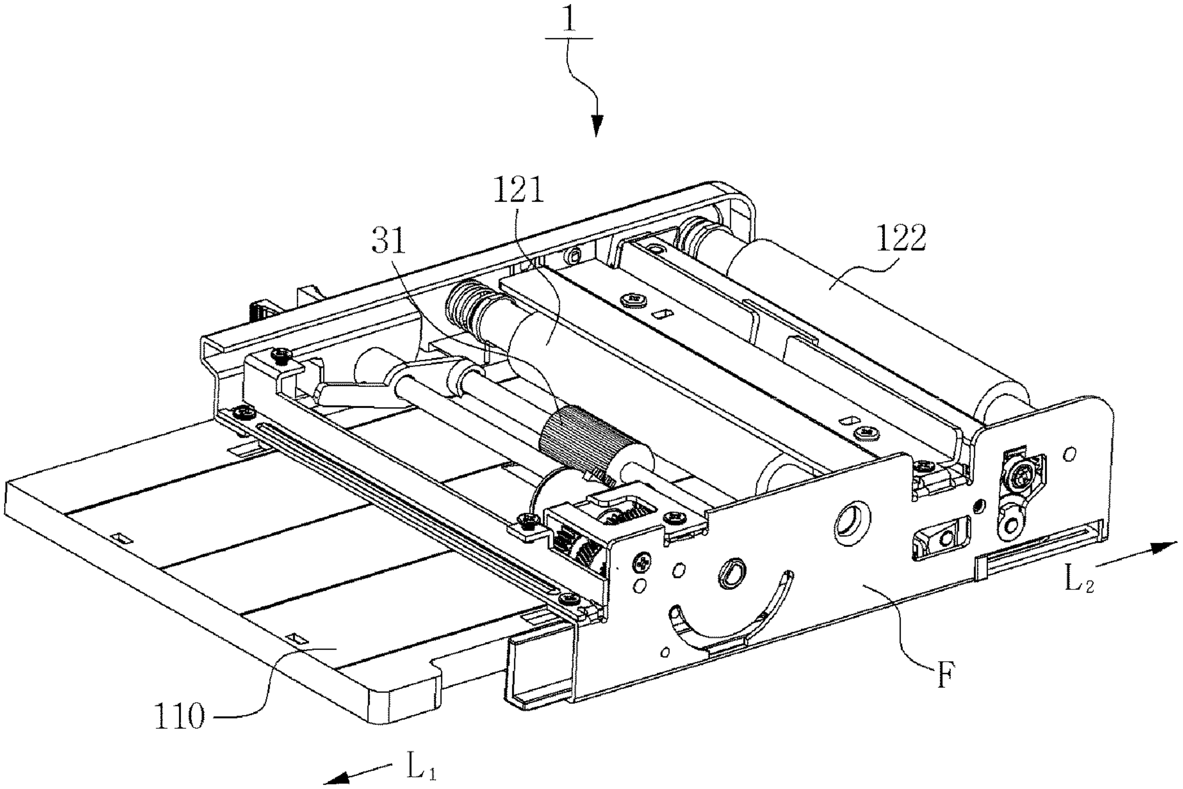
FIG. 1 to FIG. 4 are perspective views and disjointed perspective views representing the constitutions according to one exemplary embodiment of the present invention.
Figure 2:
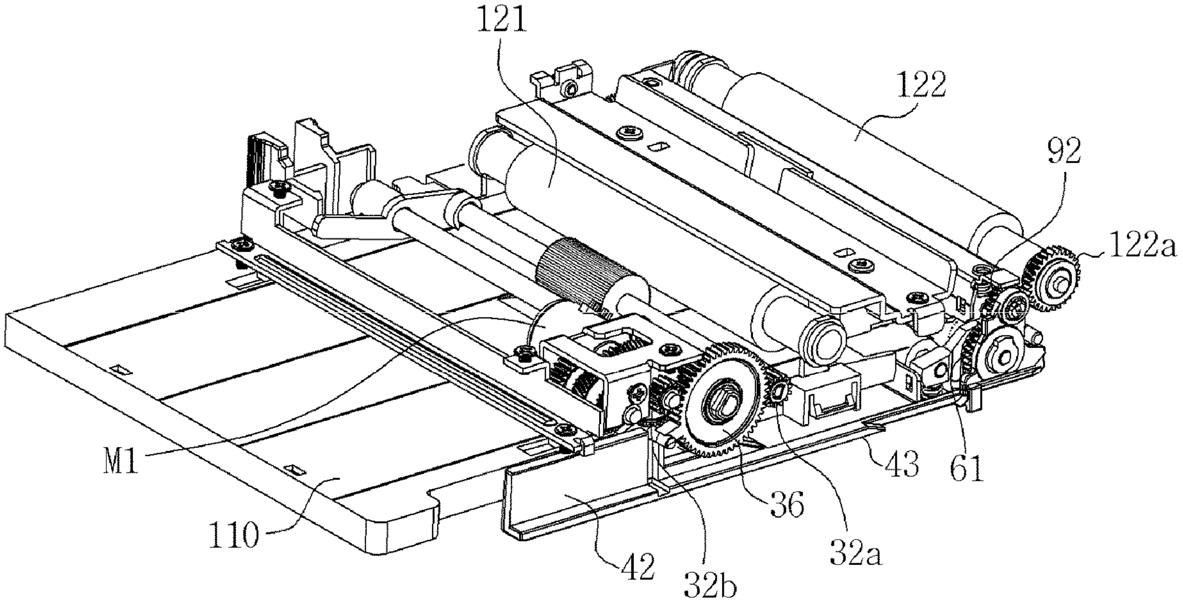
Figure 3:
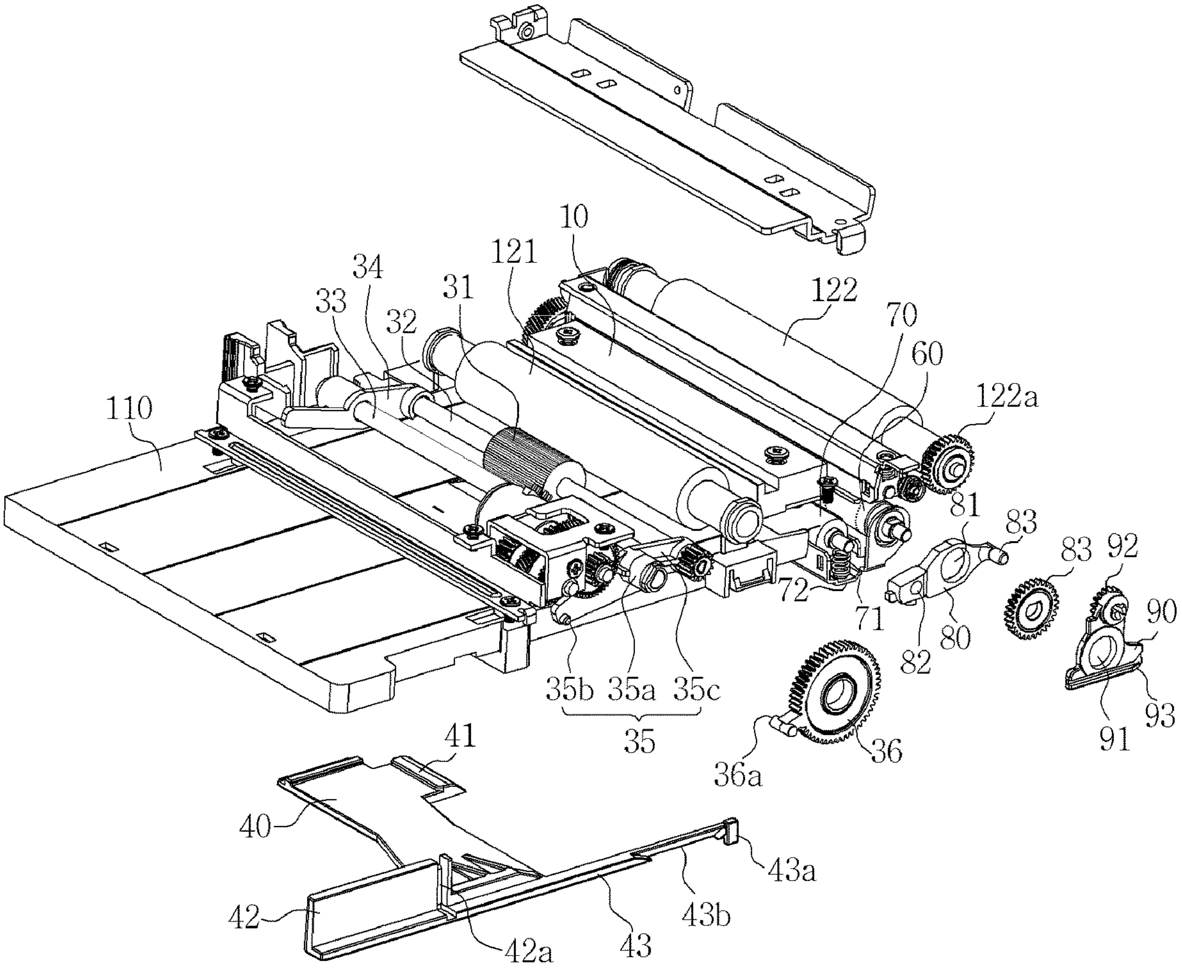
Figure 4:
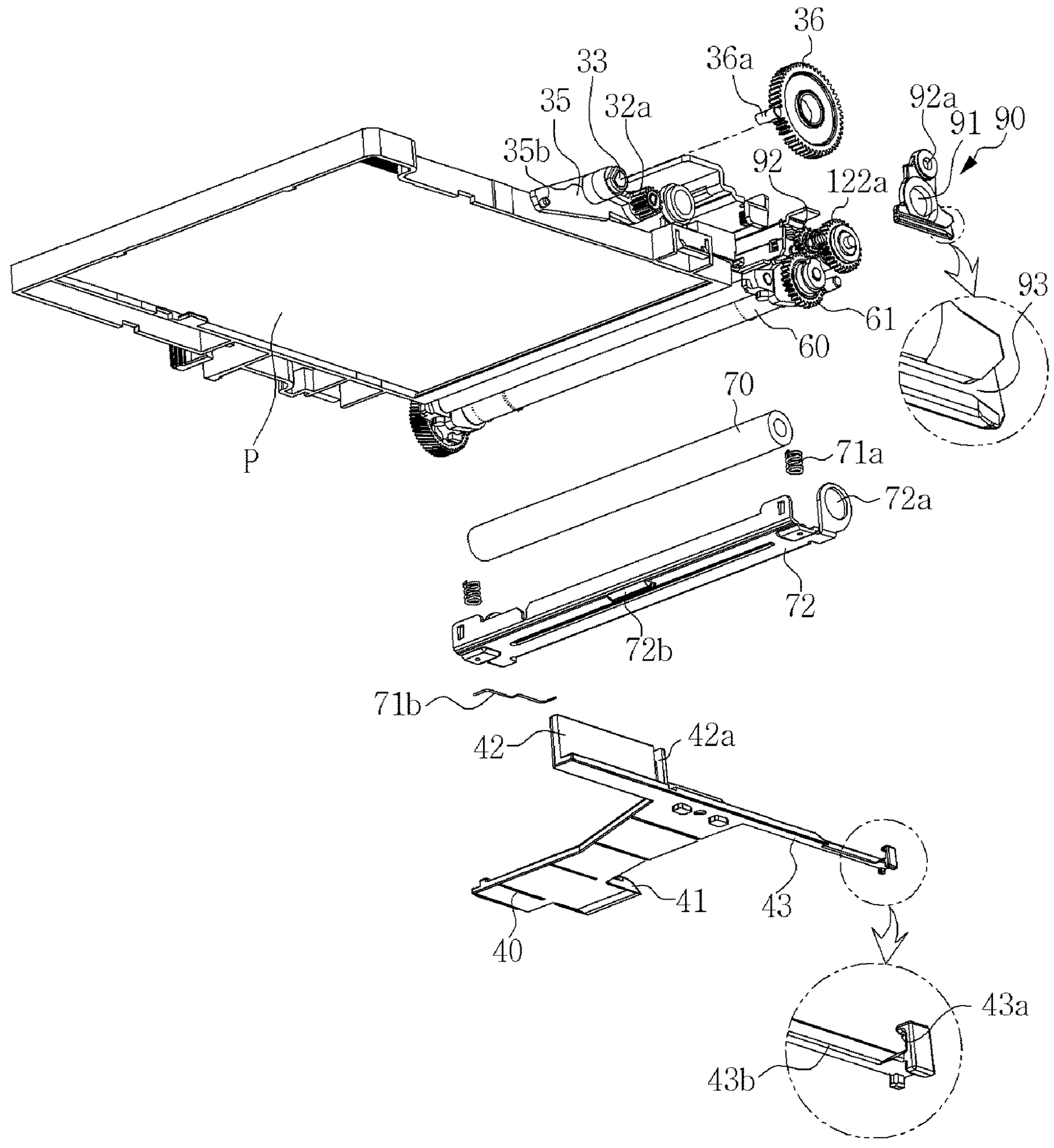

Hereinafter, the constitutions and operations of one exemplary embodiment according to the present invention will be described in detail with reference to the accompanying drawings.

Referring to FIG. 1 to FIG. 4, a dye-sublimation printer 1 according to the present invention functions to form a predetermined image on a recording medium by sublimating a dye coated on a ribbon in a state of causing the ribbon (see reference numeral "20" shown in FIG. 7B) and the recording medium P to come into close contact with each other in a space between a head 10 configured to provide heat (thermal printing head), and a platen roller 70.

The printer 1 comprises a frame F whose bottom surface and both walls are formed to be bent.

In the frame is formed an insertion groove into which a cartridge is inserted, and the cartridge comprises a receiving part 110 in which recording media are stacked and received; a supply reel 121 on which a ribbon 20 is wound; a winding reel 122 on which the ribbon transferred from the supply reel is wound; and a take-up reel gear 122*a* axially combined with one side of the winding reel 122. Accordingly, when the take-up reel gear 122*a* is driven, the ribbon wound on the supply reel 121 is transferred while being wound on the winding reel 122.

At one side of the cartridge is furnished a locking member, and in the frame F is formed a mounting hole to which the locking member is mounted.

In the present exemplary embodiment is furnished a slide plate 40 configured to move forward and backward toward a discharge side and a supply side along the bottom surface of the frame, and with one side wall of the slide plate 40 is integrally formed a pick-up plate 42 in a standing state.

The pick-up plate 42 has a guide groove 42*a* formed on an outside wall in a vertical direction. Furthermore, a cam part 36 is furnished to rotate in both directions, clockwise and counterclockwise by receiving driving power from a pick-up motor M1. The cam part 36 is configured in such a manner that a hook projection 36*a* located in the guide groove 42*a* is formed to protrude on one side of a circumferential surface. That is, the hook projection 36*a* is assembled in a state of being put under control of the guide groove 42*a* so that a position of the hook projection is variable when the cam part 36 rotates, and the pick-up plate 42 and the slide plate 40 integrally formed therewith move forward and backward due to variableness in position of the hook projection 36*a*. More specifically, as the cam part 36 rotates clockwise, when the hook projection 42*a* is located at a position between a six o'clock direction and a nine o'clock direction, the slide plate 40 moves backward toward the supply side L1, and as the cam part 36 rotates counterclockwise, when the hook projection 36*a* is located at a position between a six o'clock direction and a one o'clock direction, the slide plate 40 moves forward toward the discharge side L2.

Furthermore, the cam part 36 is combined with one side of a fixed axis 33 fixed to the frame, and has a delivery gear 32*b* in a space between an output axis of the pick-up motor and the cam part 36 so as to receive driving power transmitted from the pick-up motor M1.

A pick-up roller 31 having an axis 32 running parallel with the fixed axis 33 is furnished, both ends of the fixed axis 33 are connected to both ends of the axis 32 of the pick-up roller, respectively. That is, the fixed axis 33 and the axis 32 of the pick-up roller are disposed to be parallel with each other as one side of the fixed axis and one side of the axis of the pick-up roller are connected to each other by a pick-up lever 35, and another sides thereof are connected to each other by a connection member 34.

Although the fixed axis 33 is fixed by being supported to the frame F, both ends of the axis 32 of the pick-up roller 31 are only connected to both ends of the fixed axis via the pick-up lever 35 and the connection member 34, and the pick-up roller is not fixed to the frame F.

A pick-up projection 35*b* is formed on one side of the pick-up lever 35. Accordingly, the pick-up lever 35 turns round the fixed axis 33 according to a position of the pick-up projection 36*b*, and according to the principle of a lever, the axis 32 of the pick-up roller moves upward and downward while swinging centering around the fixed axis 33.

Figure 7A:
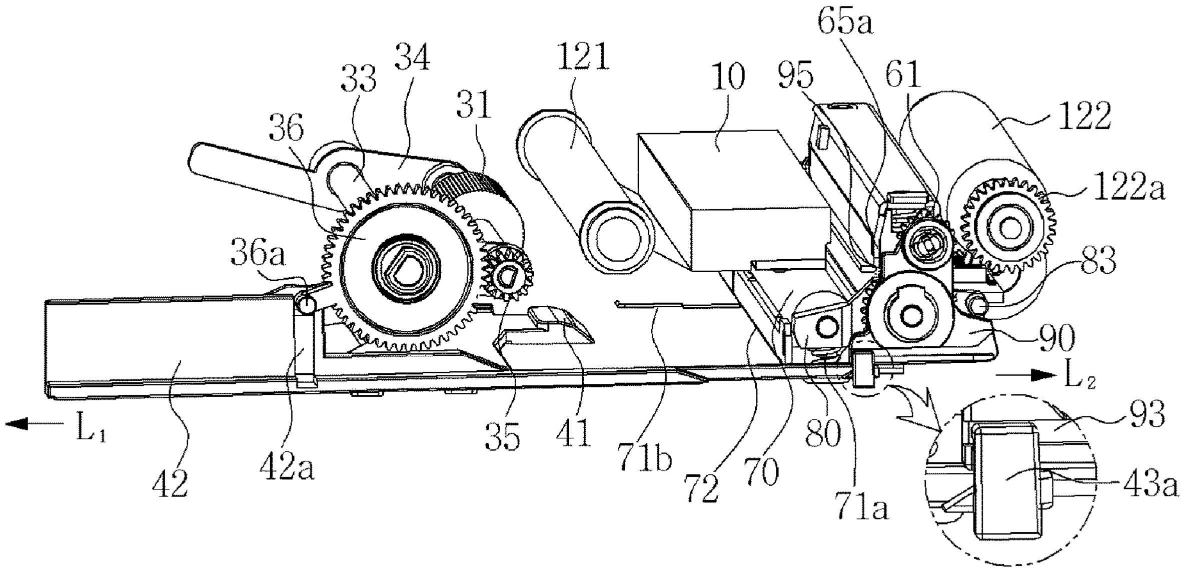
FIGS. 7A-7B represent a pick-up step in which a recording medium is transferred to a discharge side according to another exemplary embodiment of the present invention.
Figure 7B:
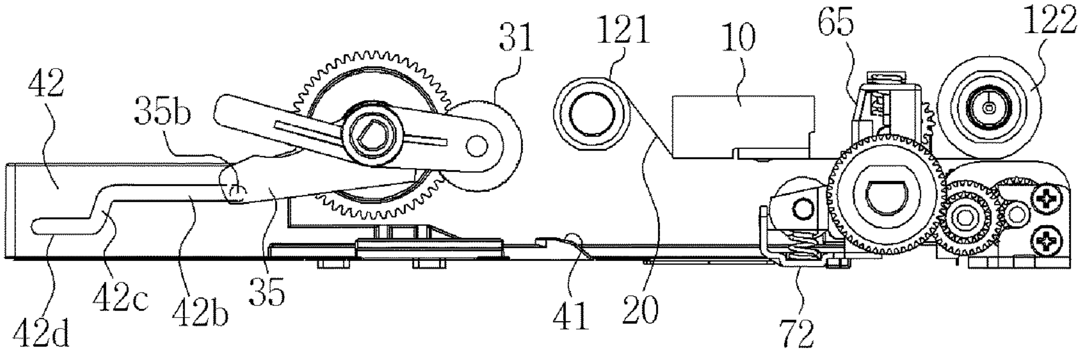

A guide rail to which the pick-up projection 35*b* is guided is formed on an inside wall of the pick-up plate 42 (shown in FIG. 7B).

Like this, the double step guide rail formed on the inside wall of the pick-up plate 42 is a constituent element which guides the pick-up projection 35*b*, and comprises: an upper rail 42*b* which causes the pick-up projection 36*b* to be located at an upper portion; a lower rail 42*d* which causes the pick-up projection 35*b* to be located at a lower portion; and a slope rail 42*c* having an incline so as to connect the upper rail and the lower rail to each other.

When the pick-up plate 42 moves backward toward the supply side L1, the pick-up projection 35*b* is located at the upper rail 42*b* (shown in FIG. 7B), and accordingly the pick-up roller 31, one end of the axis 32 of which is connected to another end of the pick-up lever 35, becomes to be in a downward state. Like this, when the pick-up roller 31 is in the downward state, it comes into close contact with an upper portion of a recording medium received in the receiving part 110 so that the recording medium can be supplied forward (see FIG. 1 and FIGS. 7A-7B).

Figure 8A:
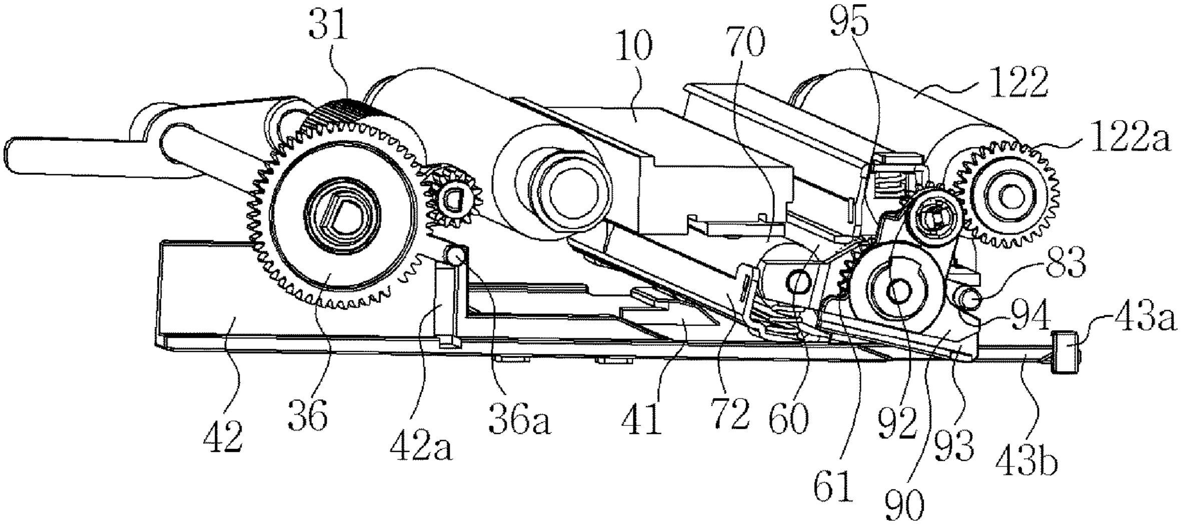
FIGS. 8A-8B represent a print step in which the recording medium is printed with an image according to another exemplary embodiment of the present invention.
Figure 8B:
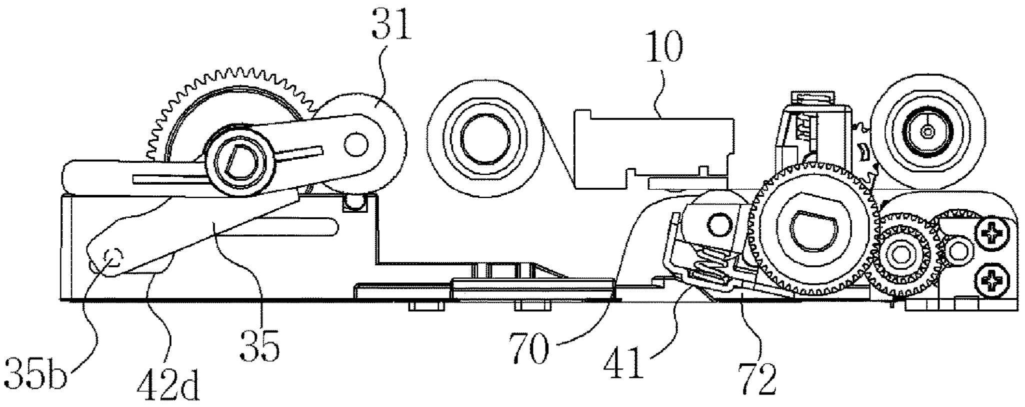

Furthermore, when the pick-up plate 42 moves forward toward the discharge side L2, the pick-up projection 35*b* is located at the lower rail 42*d* by passing through the slope rail 42*c* from the upper rail 42*b* (see FIGS. 8A-8B). Accordingly, the pick-up lever 35 rotates centering around the fixed axis 33, and another end of the pick-up lever 35 moves upward according to the principle of a lever. Accordingly, the pick-up roller 31, one end of the axis 32 of which is connected to another end of the pick-up lever 35, becomes to be in an upward state. Like this, when the pick-up roller 31 is in the upward state, it does not come into close contact with the upper portion of the recording medium received in the receiving part 110, so the recording medium cannot be supplied forward.

Furthermore, a swing control part 43 formed to be extended in a bar-like shape is furnished on one side of the slide plate 40, and the swing control part 43 and the pick-up plate 42 are integrally formed on the same side as the slide plate 40.

The swing control part 43 is configured in such manner that a projection 43*a* is formed at a front end of the discharge side L2, and an escape groove 43*b* is formed to be spaced apart from the supply side.

Also, a feed roller 60 is furnished to transfer the recording medium into both directions by transmission of the driving power of a feed motor (not drawn) driven in the both directions, both ends of the axis of the feed roller 60 are supported to the frame F, and a feed gear 61 is axially combined with one side of the feed roller 60.

A swing lever 90 is furnished at an outer side of the feed gear 61, and swings round the axis of the feed roller by the axis of the feed roller 60 being mounted to a mounting hole, and at an upper side is formed a gear installation part 92*a* with which a swing gear 92 is axially combined, and at a lower side is horizontally formed a swing control groove 93.

The swing gear 92 always engages with the feed gear 61. However, the swing gear 92 may engage with or may not engage with a take-up reel gear 122*a* according to swing directions of the swing lever 90. That is, when the swing lever 90 swings toward the discharge side (clockwise) centering around the axis of the feed roller 60, the swing gear 92 engages with the take-up reel gear 122*a* while moving beyond the feed gear 61 in a state of maintaining engagement with the feed gear 61.

On the contrary, when the swing lever 90 swings toward the suppled side (counterclockwise) centering around the axis of the feed roller 60, the swing gear 92 does not engage with the take-up reel gear 122*a*. When the swing gear 92 and the take-up reel gear 122*a* engage with each other, driving power of the feed motor is transmitted to the feed gear 61, and is again transmitted to the swing gear 92 and the take-up reel gear 122*a* in order so that the winding reel 122 rotates, and thus the ribbon is transferred while being wound on the winding reel 122.

Because the swing lever 90 is combined with the axis of the feed roller 60 which rotates in both directions, when the feed roller 60 rotates, the swing lever 90 swings in the both directions (clockwise or counterclockwise) centering around the axis of the feed roller 60 due to impellent force generated by a rotation.

Meanwhile, the projection 43*a* moves forward and backward along the swing control groove 93 of the swing lever 90, and when the projection 43*a* is located in the swing control groove 93, although impellent force occurs by the feed roller 60 rotating, the swing lever 90 is not able to swing because it is caught in the projection 43*a*.

Furthermore, the escape groove 43*b* is configured to make a lower end of the swing lever 90 disappear therein when the swing lever 90 rotates due to the impellent force of the feed roller 60 (shown in FIG. 8A). If there is not the escape groove 43*b*, the lower of the swing lever 90 will be intervened with the swing control part 42, and the swing lever cannot swing, so the escape groove 43*b is formed.*

Figure 5:
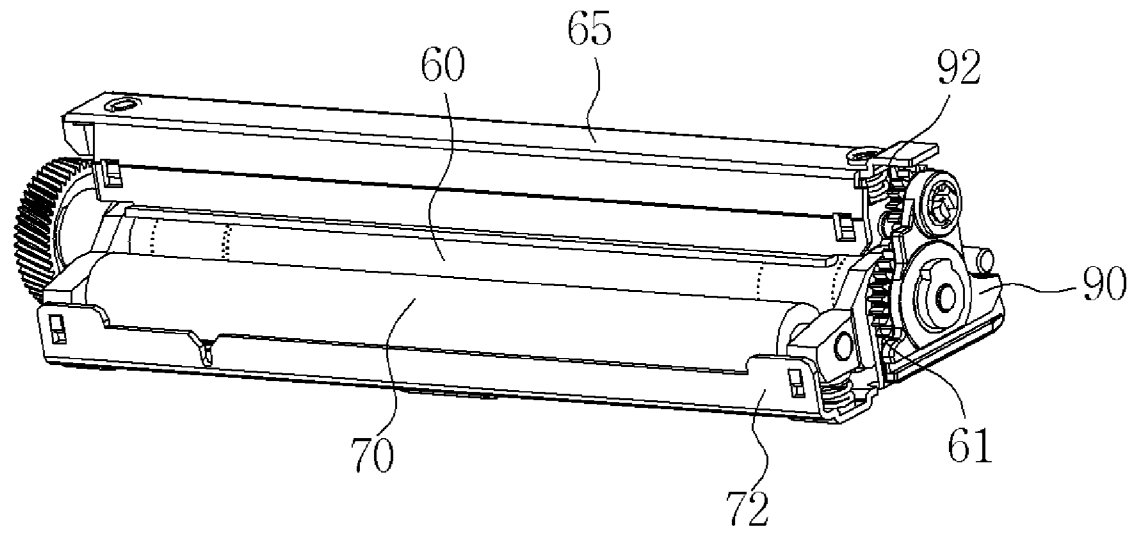
FIG. 5 and FIG. 6 are a perspective view and a disjointed perspective view representing main parts according to the exemplary embodiment of the present invention.
Figure 6:
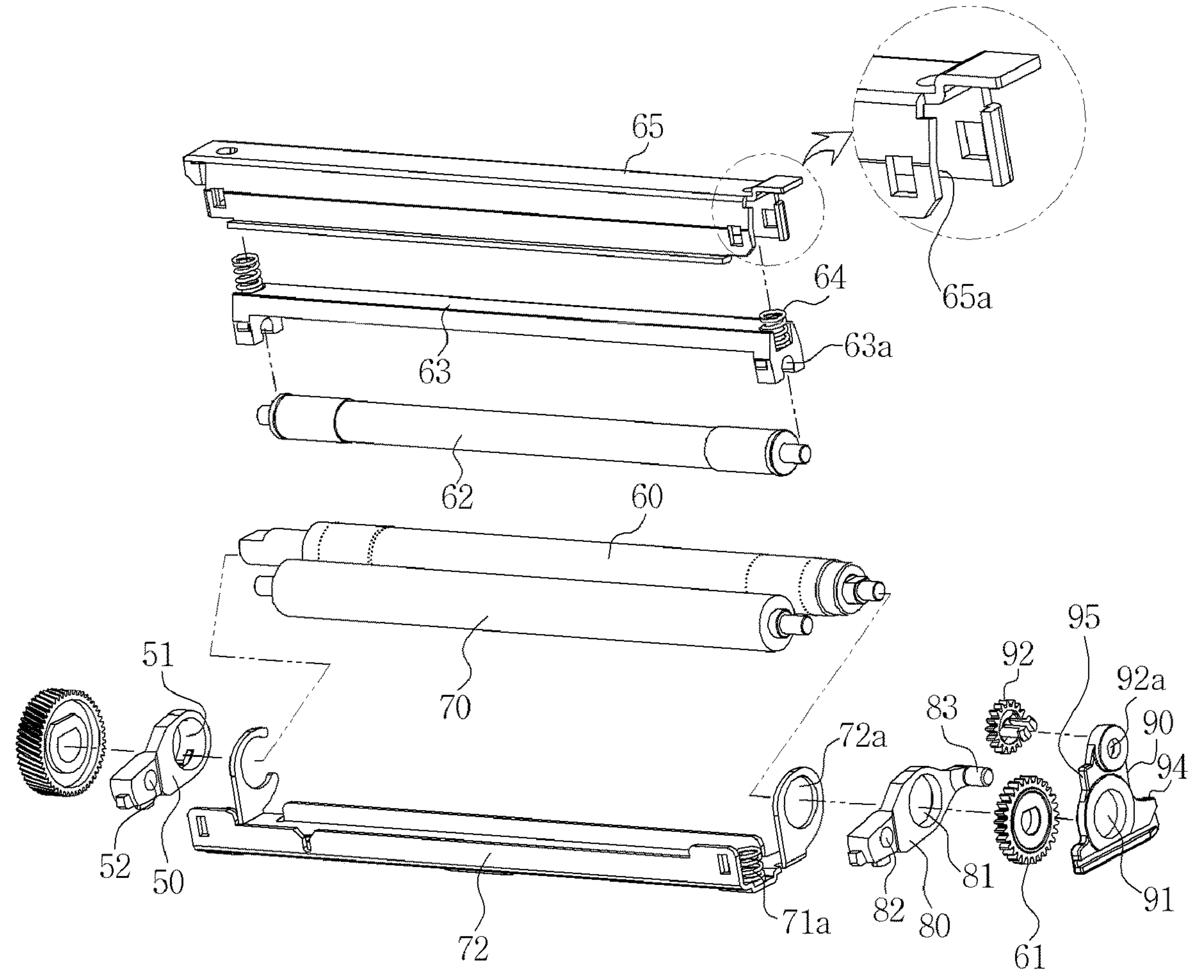

Referring to FIG. 5 and FIG. 6, a platen plate 72 is furnished to turn round the axis of the feed roller 60. That is, in order to rotatably combine the platen plate 72 with the axis of the feed roller 60, a hinge hole 72*a* through which one end of the axis of the feed roller 60 passes is formed to be biased at one side of the platen plate 72, and the platen roller 70 is supported at another side.

Furthermore, both ends of the axis of the feed roller 60 are connected to both ends of the axis of the platen roller 70, respectively. That is, a link member 50 is configured in such a manner that an axial hole 51 through which one end of the axis of the feed roller passes, and an axial hole 52 through which one end of the axis of the platen roller 70 passes are formed at one side of the feed roller 60 and one side of the platen roller 70, respectively.

Also, an engagement maintenance member 80 is configured in such a manner that an axial hole 81 through which another end of the axis of the feed roller 60 passes, and an axial hole 82 through which another end of the axis of the platen roller 70 passes are formed at another side of the feed roller 60 and another side of the platen roller 70, respectively. In particular, the engagement maintenance member 80 has a leg 83 which is formed to protrude to the discharge side. The leg 83 functions to maintain engagement of the swing gear 92 and the take-up reel gear 122*a* by applying pressure to a pressurization part 94 formed in a front side of the swing lever 90 downward when the platen plate 72 moves upward.

The platen roller 70 is not installed to be fixed to an upper portion of the platen plate 72, but is movably installed so as to move upward and downward while maintaining a state of being parallel to the feed roller centering around the axis of the feed roller 60.

Furthermore, a pair of first springs 71*a* are furnished on both sides of the platen plate 72, and the first springs elastically support both ends of the axis of the platen roller 70.

Accordingly, although the platen roller 70 is furnished at the upper portion of the platen plate 72, it is elastically movable upward and downward by the first springs 71*a*.

This is intended for causing the platen plate 72 and the platen roller 70 to move upward during printing so that the recording medium comes into close contact with a lower portion of the head 10, and for pressurizing the platen roller elastically. That is, in a state of the ribbon being located in a space between the platen roller 70 and the head 10, the first springs 71*a* elastically apply pressure to the platen roller 70 in a head direction so that the recording medium and the ribbon can come into close contact with the head, and thus the quality of an image is improved.

Furthermore, at a front end of the slide plate 40 is furnished a lifter 41 which enters a lower portion of the platen plate 72 so as to make the platen plate 72 move upward while rotating to be biased round the axis of the feed roller 60. A slope surface is formed on a front end of the lifer 41 so that the lifer can easily enter the lower portion of the platen plate 72. Also, a protruding part 72*b* which the lifter 41 comes into contact with is formed at a bottom surface of the platen plate 72, and in the present exemplary embodiment the protruding part 72*b* is formed to be round. Also, the protruding part may be formed to be inclined instead of being round.

Furthermore, a second spring (see reference numeral "71*b*" shown in FIG. 4 and FIG. 7A), one end of which is connected to the platen plate 72, is furnished. The second spring 71*b* consists of a torsion spring in the present exemplary embodiment, and another end of which is located at the frame.

The platen plate 72 always receives elastic pressure downward through the second spring 71*b*. Accordingly, when the lifter 41 enters the lower portion of the platen plate 72, the platen plate moves upward centering around the axis of the feed roller 60, and at this time the second spring 71*b* is elastically transformed. Accordingly, when the lifter 41 moves backward, the platen plate 72 turns round the axis of the feed roller 60 due to elastic restoring force of the second spring 71*b* so that the platen roller 70 moves downward.

Furthermore, at an upper portion of the feed roller 60 is furnished a pressurization roller 62 configured to transfer the recording medium and the ribbon without a slip state. The pressurization roller 62 has a support bracket 63 at an upper portion thereof, and the support bracket 63 has axial holes 63*a* into which both ends of an axis of the pressurization roller 62 are mounted. Also, a pressurization plate 65 is furnished at an upper portion of the support bracket 63. The pressurization plate 65 is a constituent element which is fixed to the frame, and an elastic means 64 is furnished at a position between the support bracket 63 and the pressurization plate. Accordingly, the pressurization roller 62 comes into close contact with the feed roller 60 as the support bracket 63 and the pressurization roller 62 are pressurized by the elastic means 64 elastically downward.

Furthermore, when the swing lever 90 swings toward the supply side, a hook part 95 formed on a side wall of the supply side of the swing lever becomes to be in touch with an inside wall 65*a* of the pressurization plate 65. Accordingly, the swing lever 90 has a limit in swing scope due to the pressurization plate 65.

MODE FOR CARRYING OUT THE INVENTION

Hereinafter, an operation state and a printing method of the dye-sublimation printer according to the present invention, in particular, a rewinding correction method intended to compensate for what a ribbon has a longer length than that of a recording medium are described.

First, FIGS. 7A-7B represent a pick-up step of the recording medium according to the present invention.

The pick-up step shows supplying one of a large number of recording media stacked in the receiving part of the cartridge to a discharge side.

As illustrated, in the pick-up step, the pick-up projection 35*b* formed on the pick-up lever 35 is located at the upper rail 42*b*, and in a return service the pick-up roller 31 connected to another side of the pick-up lever 35 moves downward. Like this, when the pick-up roller 31 moves downward, it becomes to be in touch with the recording medium received in the receiving part.

In this state, when the pick-up motor is driven, the pick-up roller 31 supplies the recording medium to the discharge side L2 while rotating.

At this time, the cam part 36 rotates clockwise so that the hook projection 36*a* is located at a supply side (about eight o'clock direction). Thus, the hook projection 36*a* pushes the guide groove 42*a* in a direction of the supply side L1 so that a pick-up plate 42 moves backward, and the hook projection 36*a* is located at an upper end of the guide groove 42*a*. The lifter 41 integrally formed with the front end of the slide plate 40 also moves backward so that the platen plate 72 becomes to be in a downward state. Accordingly, even though the recording medium enters the lower portion of the head 10, the recording medium does not come into close contact with the head because the platen roller 70 is in a downward state, so an image is not formed.

Furthermore, when the recording medium enters a space between the feed roller 60 and the pressurization roller 62 so as to make engagement occur while being transferred to the discharge side L2, the feed motor is driven so that the feed roller 60 also normally rotates toward the discharge side L2 (clockwise). Hereinafter, what the feed roller 60 transfers the recording medium to the discharge side L2 is referred to as a normal rotation, and what the feed roller reversely transfers the recording medium to the supply side L2 is referred to as a reverse rotation.

Accordingly, although the swing lever 90 receives force to make it swing to the discharge side due to impellent force resulting from the normal rotation of the feed roller 60, at this time because the projection 43*a* of the swing control part 43 is caught in the swing control groove 93, a swing of the swing lever is obstructed. Accordingly, in spite of the impellent force resulting from the normal rotation of the feed roller 60, because the swing gear 92 and the take-up reel gear 122*a* don't engage with each other, the ribbon 20 is not wound on the winding reel 112. Only the recording medium is transferred to the discharge side by the normal rotation of the feed roller 60.

FIGS. 8A-8B represent a printing step according to the present invention.

As illustrated, in the printing step, the pick-up projection 35*b* is located at the lower rail 42*d*, and in a return service the pick-up roller 31 connected to another side of the pick-up lever 35 moves upward. That is, the recording medium is only transferred to the discharge side by the feed roller 60, and the pick-up roller 31 is spaced apart from the recording medium.

Furthermore, as the cam part 36 rotates counterclockwise, the hook projection 36*a* is located at the discharge side (about four o'clock direction). Thus, the pick-up plate 42 moves forward toward the discharge side, and the hook projection 36*a* is located at the upper end of the guide groove 42*a*. The lifter 41 integrally formed with the front end of the slide plate 40 moves forward, and enters the lower portion of the platen plate 72, thereby causing the platen plate to move upward. Due to this motion, the platen plate 72 is inclined as its one side moves upward centering around the biased hinge hole (connected to one end of the axis of the feed roller).

Like this, when the platen plate 72 moves upward while being inclined, the platen roller 70 moves upward so that the recording medium and the ribbon 20 come into close contact strongly with the lower portion of the head 10. The first springs 71 pressurize the platen roller 70 upward while supporting it elastically.

Furthermore, as the slide plate 40 moves forward, the projection 43*a* of the swing control part is located at the outside by moving forward while passing through the swing control groove 93. Also, as the feed motor is driven in a normal direction, the feed roller 60 also normally rotates to the discharge side (clockwise).

Accordingly, because the projection 43*a* does not intervene in the swing lever 90, the swing lever 90 swings toward the discharge side by the impellent force resulting from the normal rotation of the feed roller 60, so the swing gear 92 and the take-up reel gear 122*a* engage with each other. At this time, because the escape groove 43*b* is formed in the swing control part, the swing lever 90 is able to swing toward the discharge side without intervention.

Like this, the ribbon 20 is transferred while being wound on the winding reel 122 for the first time only after the swing gear 92 and the take-up reel gear 122*a* engage with each other. Specifically, the feed roller 60 rotates due to driving force of the feed motor, the feed gear 61 combined with the axis of the feed roller 60 also rotates, the swing gear 92 which always engages with the feed gear 61 rotates, and the take-up reel gear 122*a* which engages with the swing gear 92 by the swing of the swing lever 90 rotates.

Accordingly, while the recording medium and the ribbon 20 are transferred to the discharge side by the feed roller 60 in a state of coming into close contact strongly with the lower portion of the head 10, a dye of the ribbon sublimates to the recording medium so that an image is formed.

Like this, when the image is formed while the recording medium and the ribbon are transferred to the discharge side, the swing gear 92 and the take-up reel gear 122*a* should not be released from engaging. Their engagement is realized by impellent force of the feed roller 60, and for example the swing gear 92 and the take-up reel gear 122*a* may be released from engaging due to an external impact and so on during formation of the image. When the engagement is released, although the recording medium is still transferred to the discharge side by the feed roller 60, the ribbon 20 is not transferred because no driving force is transmitted to the winding reel 122. This state deteriorates a quality of the image.

Accordingly, in another exemplary embodiment according to the present invention, the printing step, in other words, when the platen plate 72 and the platen roller 70 move upward, the engagement maintenance member 80 is furnished to forcibly maintain the engagement of the swing gear 92 and the take-up reel gear 122*a*. That is, although the engagement maintenance member 80 functions to connect one end of the axis of the platen roller 70 to one end of the axis of the feed roller 60, as it is linked with an upward movement of the platen roller 70, the leg 83 formed to protrude to the discharge side applies pressure to the pressurization part 94 of the swing lever 90 downward.

Specifically, the engagement maintenance member 80 is connected to the axis of the platen roller 70 and the axis of the feed roller 60, and the axis of the feed roller 60 is fixed to the frame F, and the axis of the platen roller 70 moves upward or downward according to a forward movement or a backward movement of the lifter. When the lifter 41 enters the lower portion of the platen plate 72 so that the platen roller 70 moves upward, in a return service an opposite side (the discharge side) of the engagement maintenance member 80 moves downward centering around the axis of the feed roller 60. Accordingly, the leg 83 protruding from the discharge side applies pressure to the pressurization part 94 of the swing lever 90 downward while moving downward. Thus, although there is an external impact, the swing gear 92 and the take-up reel gear 122*a* is not released from engaging by the leg 83.

Meanwhile, the dye-sublimation printer completes printing in such a manner that the ribbons coated with dyes in cyan, magenta, yellow colors are wound in order, and after any one color sublimates, the recording medium is retransferred to a starting point of printing, so the dye in another color sublimates due to the printing motion described above.

Figure 9A:
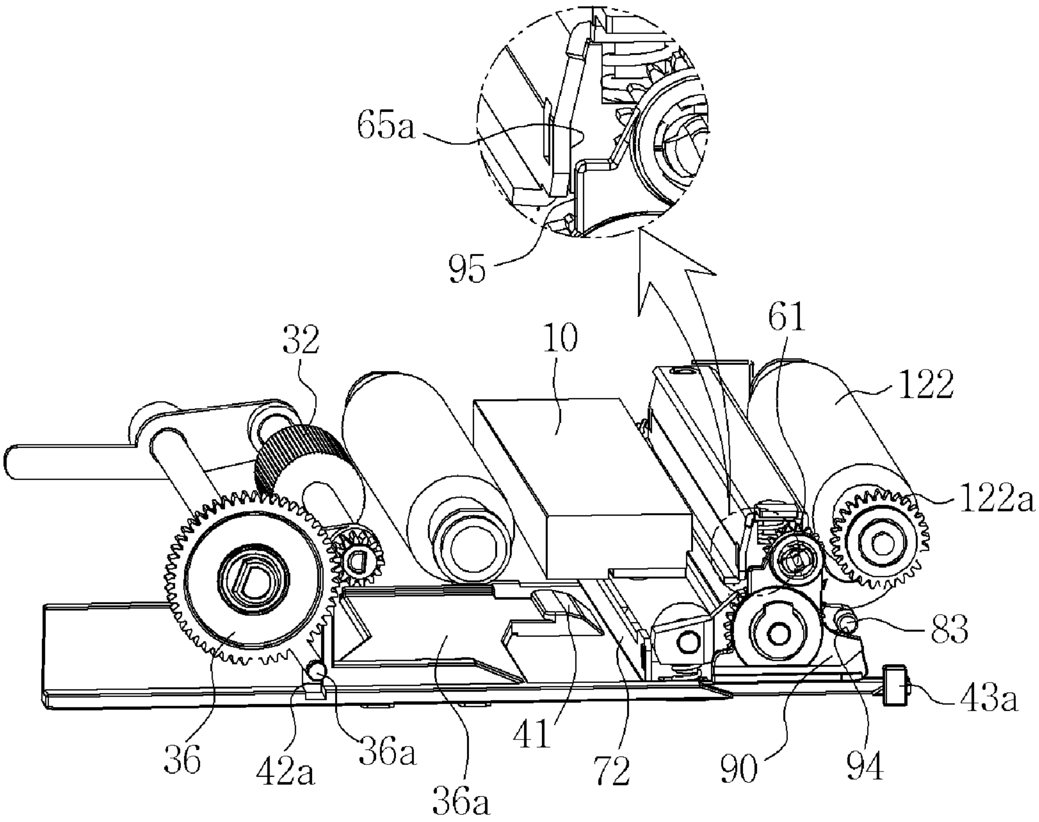
FIGS. 9A-9B represent a rewinding step in which the recording medium is transferred to a supply side according to another exemplary embodiment of the present invention.
Figure 9B:
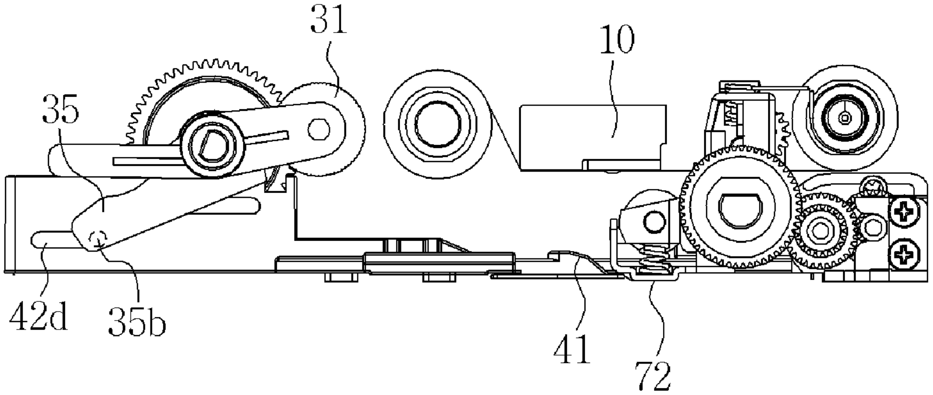

FIGS. 9A-9B represent a rewinding step in which the recording medium is retransferred to the starting point of printing after any one color sublimates.

As illustrated, in the rewinding step, the pick-up projection 35*b* is located at the lower rail 42*d* of the guide rails formed on the inside wall of the pick-up plate 42, and in a return service the pick-up roller 31 connected to another side of the pick-up lever 35 is maintained in an upward state. That is, the recording medium is only transferred to the supply side by the reverse rotation of the feed roller 60, and the pick-up roller 31 is spaced apart from the recording medium. However, in comparison with FIGS. 8A-8B, there is a difference in light of the fact that the pick-up projection 35*b* is located at a tip end of the discharge side of the lower rail 42*d*. That is, it can be found that even though the pick-up plate 42 and the slide plate 40 move further forward than they can move forward in the pick-up step, they move further backward to the supply side than in the printing step.

This is because the cam part 36 partly rotates clockwise so that the hook projection 36*a* is located at the discharge side (about five o'clock direction). Thus, the hook projection 36*a* is located at a lower end of the guide groove 42*a*. The lifter 40 integrally formed with the front end of the slide plate 40 moves further backward than in the printing step so as to come out of the lower portion of the platen plate 72. Accordingly, the platen plate 72 returns to its original position by the second spring (see reference numeral "71*b*" shown in FIG. 7A), thereby moving downward.

Accordingly, the platen roller 70 also moves downward along with the platen plate 72 so as to be spaced apart from the head 10.

Furthermore, although the slide plate moves backward, the projection 43*a* of the swing control part is still located at the outside of the swing control groove 93. Also, the feed motor is driven in a reverse direction so that the feed roller 60 also reversely rotates to the supply side (counterclockwise), thereby making the recording medium move backward.

Accordingly, the swing lever 90 swings toward the supply side by counterclockwise impellent force of the feed roller 60, and due to this the swing gear 92 and the take-up gear 122*a* are released from engaging. At this time, the swing lever 90 swings until the hook part 95 is in touch with the inside wall 65*a* of the pressurization plate.

Furthermore, as the platen roller 70 moves downward, the leg 83 of the engagement maintenance member also moves upward. When the swing lever 90 swings toward the supply side, the pressurization part 94 of the swing lever 90 becomes to be in touch with the leg 83. Like this, the pressurization plate 65 and the leg 83 limit a swing scope (a swing angle) when the swing lever 90 swings toward the supply side.

In the rewinding step, only the recording medium is transferred to the supply side by the reverse rotation of the feed roller 60, and the ribbon is not transferred as the swing gear 92 and the take-up reel gear 122*a* are released from engaging.

In case that the length of the ribbon is longer than that of the recording medium, it is impossible to perform printing for forming an image in a different color even after finishing the rewinding step after the printing step.

The reason is due to the fact that although the recording medium is located at the starting point of printing through the rewinding step, the ribbon in a new color is not located yet at the starting point of printing in a state of being still wound on the supply reel because the length of the ribbon is longer than that of the recording medium.

Accordingly, in the present exemplary embodiment, there is a rewinding correction step of correcting the state in which the length of the ribbon is longer than that of the recording medium.

Figure 10A:
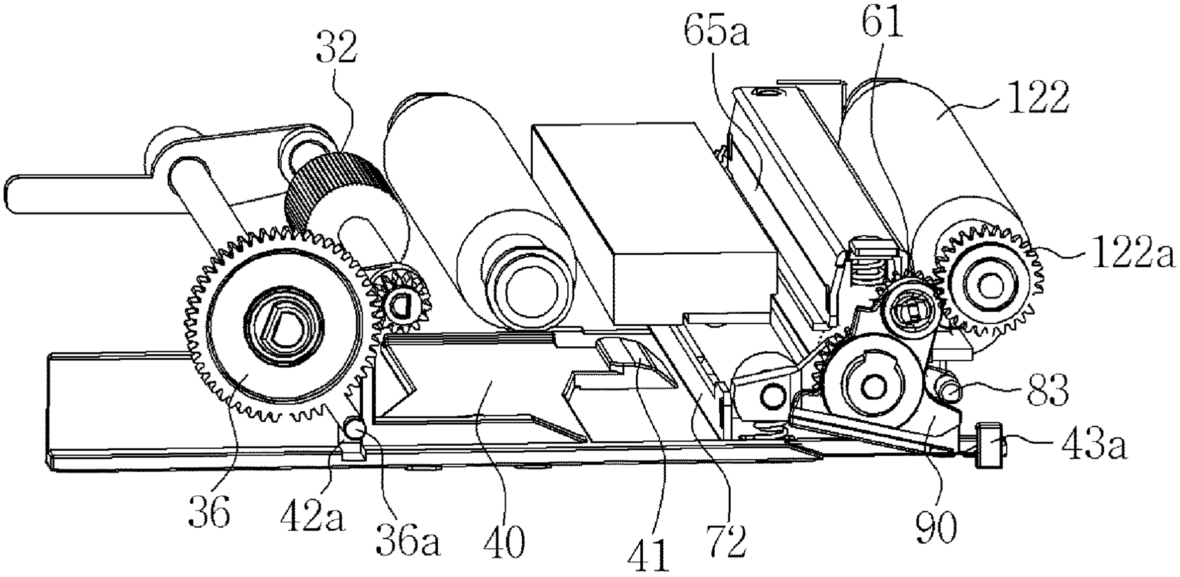
FIGS. 10A-10B represent a correction step in which the recording medium and a ribbon are transferred to the discharge side according to another exemplary embodiment of the present invention.
Figure 10B:
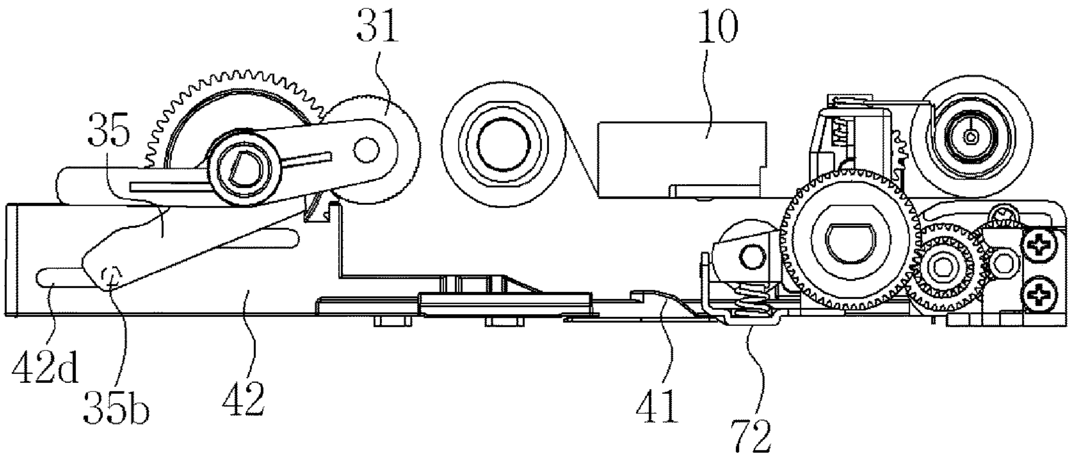

Describing in detail with reference to FIGS. 10A-10B, the ribbon is wound in a state of the recording medium being located at the starting point of printing. At this time, the ribbon is wound as much as a difference in length longer than that of the recording medium. Due to this, a starting point of the ribbon in the new color is located at the starting point of printing.

Like this, in order to wind the ribbon, the feed roller 60 normally rotates so that the swing lever 90 swings toward the discharge side due to impellent force, and thus the swing gear 92 and the take-up reel gear 122*a* engage with each other. In this state, when the feed roller 60 normally rotates, driving force of the feed motor is transmitted to the feed gear 61, the swing gear 92, and the take-up reel gear 122*a* so that the ribbon is wound and transferred while the winding reel 122 rotates.

However, as described above, when the length of the ribbon 20 is corrected by the ribbon being wound, the recording medium transferred to the starting point of printing may also not get away from being again transferred to the discharge side because the feed roller 60 normally rotates.

Furthermore, in this correction step, an image should not be formed. Accordingly, the lifter 41 is still located at the same position as that in the rewinding step shown in FIGS. 9A-9B. That is, the platen roller 70 is maintained in a downward state. In other words, a portion of the hook projection 36*a* and a position of the pick-up plate 42 are identical to those shown in FIG. 9A. Also, the pick-up projection 35*b* is also located at the same position as that in shown in FIG. 9B.

However, the feed roller 60 normally rotates as performed in the printing step shown in FIG. 8A, thereby transferring the recording medium and the ribbon to the discharge side. Also, the swing lever 90 swings toward the discharge side due to the normal direction-based impellent force of the feed roller 60 so that the swing gear 92 and the take-up reel gear 122*a* engage with each other. Accordingly, while the recording medium is transferred, the ribbon is also transferred simultaneously with being wound. Nevertheless, the recording medium and the ribbon don't come into close contact with a lower portion of the head as the platen roller 70 moves downward, so an image is not formed.

In other words, the rewinding step shown in FIGS. 10A-10B are identical to that shown in FIGS. 9A-9B with respect to each position of the pick-up plate 42, the lifter 41, the pick-up projection 35*b*, the hook projection 36*a*, and the platen roller 70, and the printing step is identical to that shown in FIG. 8A in light of the fact that the feed roller 60 normally rotates, and the fact that the swing lever 90 swings toward the discharge side due to the impellent force.

As above, the ribbon and the recording medium may be transferred to the discharge side, and due to this the ribbon in the new color may be located at the starting point of printing.

However, because this state is a state of the recording medium being transferred to the discharge side rather than the starting point of printing, the recording medium is conversely transferred to the starting point of printing through the rewinding step shown in FIGS. 9A-9B.

Through this process, the ribbon in the new color and the recording medium can be consistent with each other at the starting point of printing, and a difference in length between the ribbon and the recording medium can be corrected.

In summary, an image is formed in any one color through the pick-up step and the printing step, in the rewinding step, the recording medium is reversely transferred to the starting point of printing, in the rewinding correction step, while the recording medium is transferred to the discharge side, the ribbon is wound so that a starting point of the ribbon in the new color can be consistent with the starting point of printing, and then only the recording medium is again reversely transferred through the rewinding step, thereby being located at the starting point of printing.

That is, because the ribbon in the new color was wound so as to be located at the starting point of printing through the process shown in FIGS. 10A-10B, as shown in the rewinding step shown in FIGS. 9A-9B, the recording medium and the ribbon in the new color are located at the starting point of printing for the first time only after only the recording medium is reversely transferred to the starting point of printing, so an image can be formed with a dye in a next color.

Like this, after the printing step is performed, when the rewinding step, the rewinding correction step, and the rewinding step are performed in order, each starting point for the recording medium and the ribbon in the new color can be consistent with the starting point of printing.

INDUSTRIAL APPLICABILITY

According to the present invention, as the slide plate moves forward and backward, upward and downward movements of the pick-up roller, upward and downward movements of the platen roller, and driving of the take-up reel gear can systematically be controlled.

What is claimed is:

1. A dye-sublimation printer, comprising:

a feed roller including one side combined with a feed gear;

a swing lever combined with the feed roller so as to swing in two directions, and having a swing control groove formed horizontally;

a take-up reel gear combined with a winding reel on which a ribbon is wound;

a swing gear combined with the swing lever so as to engage with the feed gear, and configured to engage with or disengage with the take-up reel gear selectively according to the two swing directions of the swing lever; and a swing controller configured to control the swing lever, wherein the swing controller includes a projection disposed at a front end of a discharge side and an escape groove disposed apart from a supply side, and wherein the swing control groove is configured to catch the projection.

2. The dye-sublimation printer of claim 1, further comprising:

a cam combined with one side of a fixed shaft so as to rotate in the two directions, and including a hook projection protruding from one side thereof;

a pick-up plate furnished in a standing state, having a guide groove vertically disposed on an outside wall thereof such that the hook projection is located on the guide groove, and having a guide rail which is formed on an inside wall thereof;

a pick-up lever having a center fixed to the fixed shaft, and one side having a pick-up projection located at the guide rail; and a pick-up roller having one end connected to another side of the pick-up lever, thereby moving upward and downward according to a position of the pick-up projection.

3. The dye-sublimation printer of claim 2, wherein the guide rail comprises:

a lower rail configured to locate the pick-up projection at a lower portion of the guide rail;

an upper rail configured to locate the pick-up projection at an upper portion of the guide rail; and a slope rail having an inclined surface so as to connect the lower rail and the upper rail.

4. The dye-sublimation printer of claim 2, wherein the cam is configured to move the pick-up plate forward and backward according to a rotation of the cam, and wherein the hook projection has a tip end located in the guide groove and protrudes from one side of the cam.

5. The dye-sublimation printer of claim 1, further comprising:

a head having a heater so as to form an image on a recording medium;

a platen plate configured to rotate while maintaining an axial distance centering around an axis of the feed roller;

a platen roller supported on an upper portion of the platen plate;

a slide plate connected to the pick-up plate, thereby moving forward and backward toward the supply side and the discharge side, and having a front end, wherein the swing controller extends from one side of the front end of the slide plate; and a lifter disposed at another side of the frond end of the slide plate, and configured to move the platen roller upward by entering a lower portion of the platen plate.

6. The dye-sublimation printer of claim 5, further comprising:

an engagement maintenance member configured to connect one end of the platen roller and one end of the feed roller to each other, and having a leg formed to protrude to the discharge side; and a link member configured to connect another end of the platen roller and another end of the feed roller to each other.

7. A rewinding correction method used in a dye-sublimation printer configured to form an image on a recording medium using a ribbon and configured to relocate a starting point of the recording medium and the ribbon, the method comprising:

step 1) moving a platen roller downward so to be spaced apart from a head;

step 2) reversely rotating a feed roller so that the recording medium moves backward through a space between the platen roller and the head, thereby being transferred to a starting point of printing;

step 3) rotating the feed roller, with the platen roller and the head spaced apart, so that the ribbon is wound and the recording medium moves forward toward a discharge side;

step 4) reversely rotating the feed roller, with the ribbon being in a static state, so that the recording medium moves backward toward the discharge side, thereby being retransferred to the starting point of printing; and step 5) winding the ribbon and performing printing, with the platen roller being in a state of coming into contact with the head after moving upward, while the recording medium is moving forward toward the discharge side.

8. The rewinding correction method of claim 7, further comprising moving a pick-up plate backward so that one side of a pick lever is located at an upper rail formed on one side wall of the pick-up plate, and thus a pick-up roller connected to another side of the pick-up lever moves downward so that the pick-up roller rotates in a state of coming into close contact with an upper portion of the recording medium, thereby transferring the recording medium forward.

9. The rewinding correction method of claim 8, wherein, in the pick-up step, the swing lever does not swing toward the discharge side in spite of impellent force occurring when the feed roller rotates so that a swing gear and a take-up reel do not engage with each other, and thus the ribbon is not wound, and only the recording medium moves forward toward the discharge side.

10. The rewinding correction method of claim 7, wherein, in said step 3), a swing lever swings toward the discharge side due to impellent force occurring when the feed roller rotates so that a swing gear and a take-up reel gear engage with each other, and thus the ribbon is wound while the recording medium moves forward.

* * * * *